United States Patent
Zhang

(10) Patent No.: US 8,851,828 B2
(45) Date of Patent: Oct. 7, 2014

(54) WIND TURBINE ROTOR WITH VENTURI TUBE EFFECT

(75) Inventor: Yunlong Zhang, Shanghai (CN)

(73) Assignees: Shanghai Forevoo New Energy Systems, Co. Ltd., Shanghai (CN); Shanghai Powerfooo Energy System Co., Ltd., Shanghai (CN)

( * ) Notice: Subject to any disclaimer, the term of this patent is extended or adjusted under 35 U.S.C. 154(b) by 795 days.

(21) Appl. No.: 13/120,169

(22) PCT Filed: Sep. 22, 2009

(86) PCT No.: PCT/CN2009/001062
§ 371 (c)(1),
(2), (4) Date: Mar. 22, 2011

(87) PCT Pub. No.: WO2010/037254
PCT Pub. Date: Apr. 8, 2010

(65) Prior Publication Data
US 2011/0176920 A1    Jul. 21, 2011

(30) Foreign Application Priority Data

Sep. 23, 2008  (CN) .................. 2008 2 0136467 U
Jan. 15, 2009  (CN) .................. 2009 1 0000270

(51) Int. Cl.
F03D 7/02       (2006.01)
F03D 1/06       (2006.01)

(52) U.S. Cl.
CPC ............ *F03D 1/0608* (2013.01); *Y02E 10/721* (2013.01); *F05B 2240/301* (2013.01); *F05B 2250/25* (2013.01); *F05B 2250/232* (2013.01)

USPC .............................. 415/4.1; 415/4.3

(58) Field of Classification Search
USPC ...... 415/4.1, 4.3, 4.5; 416/227 A, 227 R, 175, 416/132 A, 132 B, 232
See application file for complete search history.

(56) References Cited

U.S. PATENT DOCUMENTS

| | | | | |
|---|---|---|---|---|
| 4,115,032 A * | 9/1978 | Lange | ................ | 416/227 A |
| 4,159,191 A * | 6/1979 | Graybill | .................. | 416/11 |
| 4,218,175 A * | 8/1980 | Carpenter | ................ | 415/219.1 |
| 5,890,875 A * | 4/1999 | Silvano | ................ | 416/227 R |
| 6,132,172 A * | 10/2000 | Li | ...................... | 416/11 |
| 7,018,167 B2 * | 3/2006 | Yoshida | ................ | 415/4.5 |
| 2004/0042894 A1 * | 3/2004 | Smith | .................. | 415/4.3 |
| 2006/0099077 A1 * | 5/2006 | Van De Klippe | ......... | 416/132 B |
| 2008/0075599 A1 * | 3/2008 | Miller | .................. | 416/182 |

* cited by examiner

Primary Examiner — Edward Look
Assistant Examiner — Aaron R Eastman
(74) Attorney, Agent, or Firm — MKG, LLC

(57) ABSTRACT

The present invention discloses a rotor of wind energy conversion system (WECS) with the Venturi-tube effect. All the blades mounted on the blade-mounting seat envelop together to form a revolving-body cage turbine, which can be divided from structure into a head portion at the windward end, a tail portion at the wind exhaust end, and an airstream compression portion between the head portion and the tail portion and constituted by the enveloping blades. The revolution diameter of the airstream compression portion is gradually substantially increased from the head portion to the tail portion. The cage turbine forms a dynamic Venturi tube during the revolving process, with which the blade revolves to constitute its outline tube wall with the air permeability. The airstream passes through a window between the blades, and the incoming wind does work towards the blade during the process of permeating from the external space to the internal space of this outline tube wall, thus realizing the energy transfer.

25 Claims, 12 Drawing Sheets

WIND TURBINE ROTOR WITH VENTURI TUBE EFFECT

FIELD OF THE INVENTION

The present invention relates to a rotor system of the wind energy conversion system (WECS), and particularly to a WECS rotor with the Venturi-tube effect.

BACKGROUND OF THE INVENTION

For those skilled in the WECS technical field, there are always many problems to be solved. For example, how to improve the wind energy utilization efficiency, and particularly how to acquire the wind energy utilization efficiency as high as possible in a specific swept area; how to make the WECS more compact in size; how to operate the WECS more safely; and how to reduce noise pollution of the WECS.

The existing well-known common three-bladed horizontal-axis-rotor WECS is the most universal and representative WECS. However, it still has some drawbacks, such as it has a lower average wind energy utilization coefficient. Although the highest value is 0.593 according to the Betts Limit theory, this value can never be reached. The most advanced current technical index is about 0.4, but this value can be available only simultaneously under various optimum conditions, such as the wind speed is ideal at about 12 m/s, and the tip-speed ratio is close to 5. In an actual complicated and volatile operation process, the wind energy utilization efficiency is far below such a level of 0.4. Moreover, a drawback of the three-bladed horizontal-axis-rotor WECS is that the tip-speed ratio of the horizontal-axis-rotor turbine is generally about 4-7; under such high speed conditions, the blade cutting airstream will produce a very high aerodynamic noise, and meanwhile a lot of birds can hardly survive. Therefore, some countries begin to limit and even forbid practical application of this kind of WECS. Furthermore, with a very high turbine turning speed of the running horizontal-axis-rotor WECS, a large centrifugal force under very strong wind conditions will usually result in breakup and damage of the rotor, even a "runaway" injury accident. That is, the horizontal-axis-rotor WECS is not safe enough. Besides, it is not suitable to be mounted at such places as roofs and high buildings in a city, which also limits its application location. The reasons as described above indicate that the WECS must be continuously innovated and improved to further meet the requirements of customers.

However, all the various disclosed technical approaches can hardly solve the above problems ideally, either for the horizontal-axis-rotor WECS or for the vertical-axis-rotor WECS.

An explanation will be made below with reference to the relevant background of knowledge and technology. Some terms and relevant knowledge and principles are mentioned in many places of the present specification, such as "Bernoulli principle", "Venturi-tube effect", "blade airfoil", "tip-speed ratio", "relation between tip-speed ratio and wind energy conversion efficiency", and "wind energy capturing efficiency". This knowledge and principles are the basic concepts and knowledge in the fields of aerodynamics and wind power generation, and will thus not be described here in detail.

SUMMARY OF THE INVENTION

A purpose of the present invention is to provide a rotor system that is both simple and efficient and can particularly utilize the Venturi-tube effect, so as to overcome technical drawbacks and disadvantages of the existing technology. This rotor system can improve the wind energy utilization efficiency, and can particularly acquire the wind energy utilization efficiency as high as possible in a specific swept area; it can make the WECS more compact in size; it can make the WECS operate more safely; and it can reduce noise pollution of the WECS.

In order to attain the above purpose, a technical solution of the WECS rotor with the Venturi-tube effect of the present invention is presented as below: The WECS rotor with the Venturi-tube effect of the present invention includes a horizontal main shaft with multiple blades positioned around, a blade-mounting seat fixed on the main shaft for mounting the blades, and a connector between them. All the blades mounted on the blade-mounting seat envelop together to form a revolving-body cage turbine with the main shaft as the revolving axle. The blade-mounting seat includes a front blade-mounting seat and a rear blade-mounting seat, with both ends of the blade fixed on the two blade-mounting seats, respectively. The cage turbine includes a head portion at the windward end, a tail portion at the wind exhaust end, and an airstream compression portion between the head portion and the tail portion and constituted by the enveloping blades. The cage turbine forms a dynamic Venturi tube during the revolving process, with which the blade turns to constitute its outline tube wall with air permeability. The airstream passes through a window between the blades, and the incoming wind does work towards the blade during the process of permeating from the external space to the internal space of this outline tube wall, thus realizing the energy transfer.

The present invention is advantageous in the following aspects: The air-intaking amount and the air-intaking speed are increased due to utilization of the Venturi-tube effect, and particularly due to the design of a special WECS rotor based on the Venturi-tube effect principle. Thus the aerodynamic lift for the rotor will be increased according to the Bernoulli principle. Hence the turning torque will be increased, with which the useful work is also increased. More importantly, this WECS rotor can therefore lower the requirement for the start-up wind speed, allowing easy electricity generation at a low start-up wind speed. Therefore, this WECS rotor facilitates great expansion of speed and zone range where the WECS can be developed and applied as well as wide application of the WECS. Moreover, the linear speed of this rotor at the cut-in wind position is greatly reduced compared with that of the three-bladed horizontal-axis-rotor WECS, and thus the airstream friction noise is greatly reduced, hence preventing the noise pollution. Since the high linear speed is prevented and reduced, the harm to birds is also greatly reduced. Because the blade is mounted by means of the twin head connection and the linear speed reduced as well, the harm done by the centrifugal force is also significantly reduced, thus improving safety.

BRIEF DESCRIPTION OF THE DRAWINGS

The present invention will further be described below with reference to drawings and examples.

DETAILED DESCRIPTION OF THE EMBODIMENTS

The following information can be known according to the common aerodynamics principles about the "Bernoulli principle" and particularly the "Venturi-tube effect": A fluid increased in the flow speed will result in the fluid reduced in the pressure; the Venturi-tube effect is based on the Bernoulli principle, that is, the higher the flow speed of the fluid is, the lower the pressure is; the Venturi-tube effect principle is that the air pressure around the upper edge of the leeward side of an obstacle is relatively lower when the wind blows the obstacle, thus producing an adsorption effect and causing the airflow. The Venturi-tube effect principle is described as below: Constituting a compressed flow field for making the airstream "change from thick to thin", so as to speed up the airstream; the accelerated flow speed will surely result in the reduced fluid pressure, making a "vacuum" area formed at the rear of the outlet of the Venturi-tube effect; this vacuum area will attract the surrounding wind to a certain extent.

Figure 1:
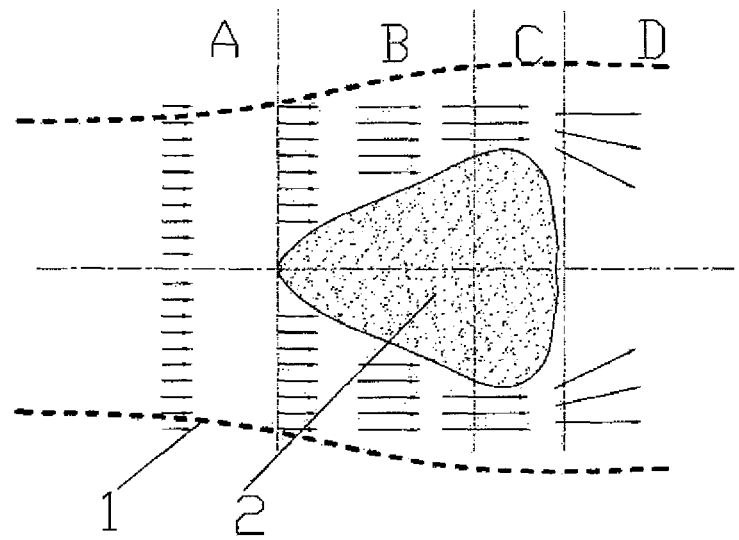
FIG. 1 is a schematic drawing of the principle of the Venturi-tube effect.
Figure 2:
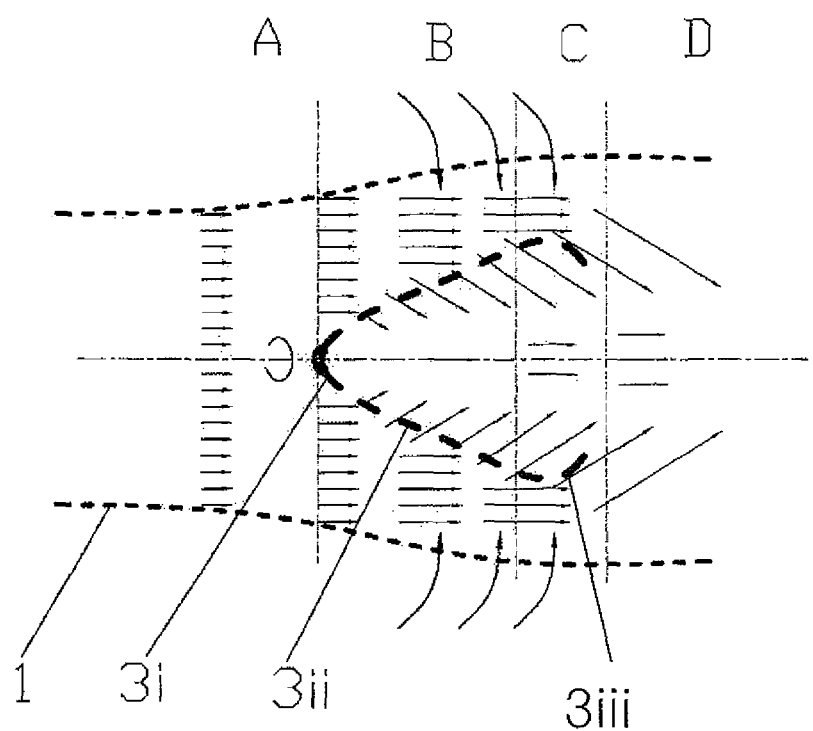
FIG. 2 is a principle diagram of the turbine rotor with the Venturi-tube effect formed by the revolving-body turbine rotor according to the present invention.

FIG. 1 is a schematic drawing of a physical model of the Venturi tube. When a conical cage revolving-body obstacle is placed in a flow field with a steady wind speed, the following changes will occur in the flow field: On one hand, the flow path of the airstream will be changed by this obstacle, with the airstream flowing along its external outline wall; obviously, with the revolving-body obstacle increased in the diameter, the wind speed will be increased continuously while the pressure decreased; only until the fluid leaves the influence area of this obstacle will its speed and pressure be recovered gradually to the original level; this phenomenon will keep on if this obstacle is not moved away. The present invention makes the following design according to this physical phenomenon: Replacing the conical cage revolving-body obstacle as described above with a cage turbine constituted by some enveloping windward blades, making the incoming flow blow along the axial direction of this turbine. This has the following results: The cage turbine will turn first, with the wind passing through the gap between the blades to transfer part of the energy to the blades; this will make the turbine rotor turn faster, and thus the fluid pressure at the blades will be reduced; according to the Bernoulli principle and the Venturi-tube effect, the external wind will be inhaled into the space originally unapproachable when the turbine rotor is static; therefore, more energy is transferred continuously to the blades of the cage turbine, making the rotor turn faster; since the radius of the rotor is much smaller than that of the three-bladed horizontal shaft, the relative speed of the cutting airstream will be much smaller; hence, not only the wind energy is utilized efficiently, but the airstream noise reduced as well. FIG. 2 is just a principle explanation made on the phenomenon as described above.

The present invention provides a cage revolving-body rotor, and specifically designs a WECS rotor with the Venturi-tube effect. This rotor, with its main shaft substantially in parallel with the wind direction under normal working conditions, includes a horizontal main shaft with multiple blades positioned around, a blade mounting bracket used for mounting the blades, and a connector and a follower between the blades. All the blades mounted on the blade-mounting bracket envelop together to form a cage revolving body with the main shaft as the revolving axle. This cage revolving body, as the core body of the rotor, can be divided from structure into a head portion at the windward end, a tail portion at the wind exhaust end, and the blade-enveloping portion between the above two portions. The revolution diameter from the blade-enveloping portion between the head portion and the tail portion is substantially increased gradually. The blades of this blade-enveloping portion naturally form a dynamic Venturi tube outline during their turning process with the rotor. With the incoming wind blowing, its outline wall forms together with the flow field of the incoming wind a gradually converged circular space with the Venturi-tube effect. On one hand, the airstream naturally passes through the blades to make the blades continuously absorb energy to drive the rotor to turn; on the other hand, the pressure gradient of the flow field of the dynamic Venturi tube as described above from the upstream to the downstream position along the neighborhood of the outline wall is gradually decreased, while the speed gradient gradually increased. According to the action of the Bernoulli principle, and particularly of the Venturi-tube effect, there will be more airstream inhaled to the tube wall from the outer circle compared to the no-turning situation, and permeating the tube wall to do work to the blades to obtain more energy. This effect keeps on working, and as a result the rotor will obtain a higher wind energy utilization coefficient.

The details are described as below:

A WECS rotor with the Venturi-tube effect is provided, including a horizontal main shaft with multiple blades positioned around, a blade-mounting seat fixed on the main shaft for mounting the blades, and a connector between the blades. All the blades mounted on the blade-mounting seat envelop together to form a revolving-body cage turbine with the main shaft as the revolving axle. The blade-mounting seat includes a front blade-mounting seat and a rear blade-mounting seat, with both ends of the blade fixed on the two blade-mounting seats, respectively. The cage turbine includes a head portion at the windward end, a tail portion at the wind exhaust end, and an airstream compression portion between the head portion and the tail portion and constituted by the enveloping blades. The cage turbine forms a dynamic Venturi tube during the revolving process, with which the blade revolves to constitute its outline tube wall with air permeability. The airstream passes through a window between the blades, and the incoming wind does work towards the blades during the process of permeating from the external space to the internal space of this outline tube wall, thus realizing the energy transfer.

The conical revolving-body has a small head and big tail; the virtual boundary outline of the influence area formed by the airstream after being subject to an obstacle forms together with the conical revolving-body obstacle a special Venturi tube, i.e. a Venturi tube with a circular conical revolving-body section, with such processes as the airstream being compressed, accelerated, and decompressed occurring one by one (That is, as shown in FIG. 2, the airstream is introduced in the segment A, and compressed, accelerated, and decompressed gradually in the segment B; a part of the fluid wind energy outside the original flow field is inhaled in the rear half of the segment B as well as in the segment C; and then the airstream is expanded, decelerated, and pressurized inside the cage turbine and the segment D).

In the WECS rotor with the Venturi-tube effect, the open axial space at the tail portion of the cage turbine can be provided inside with no blade, and allows supporting the blade with a support element provided with the blade-mounting seat.

Figure 3:
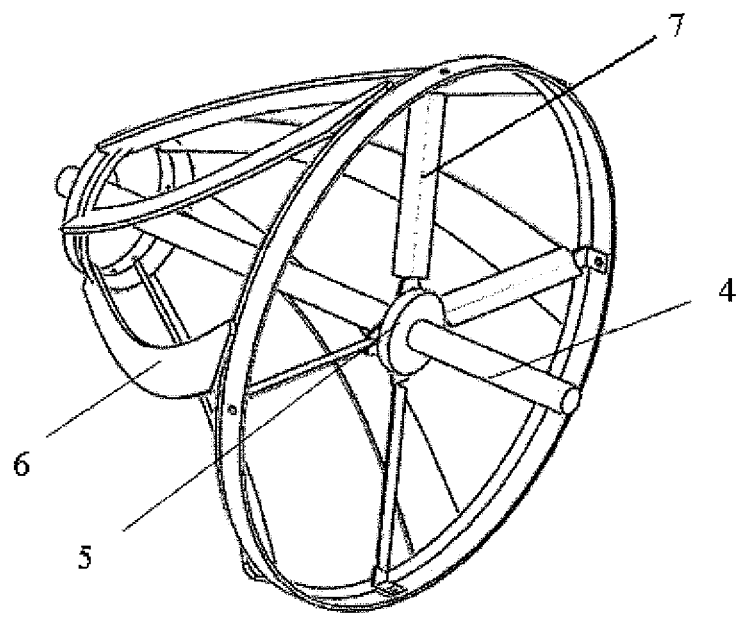
FIG. 3 is a schematic drawing of a revolving-body cage turbine rotor with an exhaust blade at the tail portion according to the present invention.

Alternatively, the exhaust blade, located in a plane perpendicular to the axial direction at the tail portion of the cage turbine, can be used not only for supporting the blade, but also as an exhaust fan for ejecting the residual airstream from the upstream site backward out of the cage turbine, thus making the cage turbine produce sustained vacuum and propelling the airstream to circulate smoothly, as shown in FIG. 3.

Figure 4:
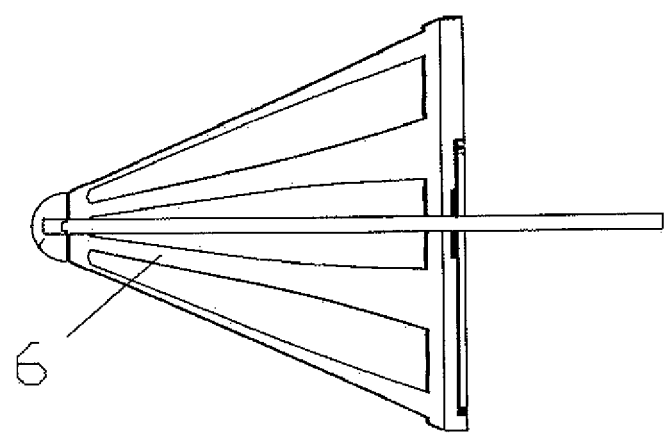
FIGS. 4 and 5 are schematic drawings of a cage turbine rotor with a "V-shaped" axial section according to the present invention.
Figure 5:
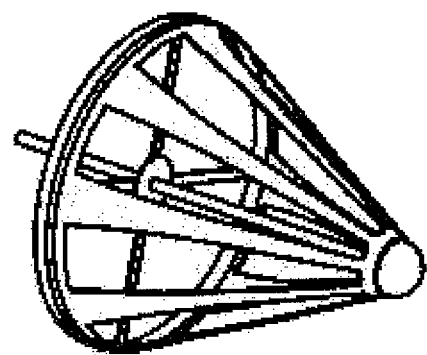

The revolution diameter of the airstream compression portion of the cage turbine is gradually increased from the head portion to the tail portion. As shown in FIGS. 4 and 5, the cage turbine has a "V-shaped" axial section and a badminton-shaped body outline, that is, its contour line is of a curve approximately straight.

Figure 6:
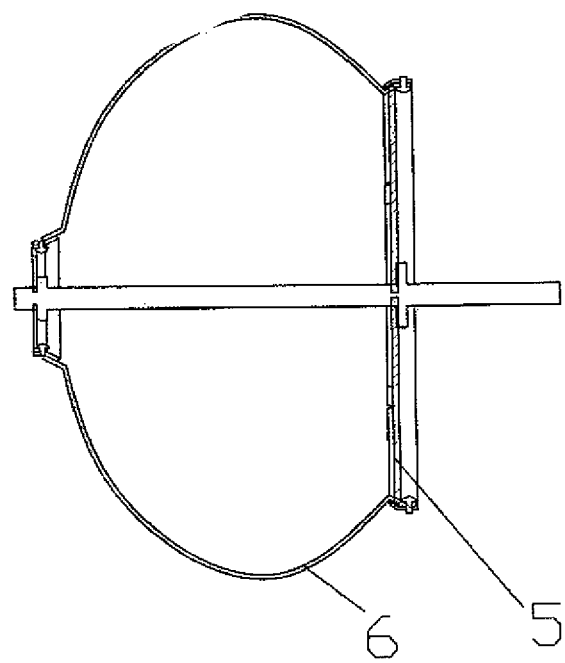
FIGS. 6 and 7 are schematic drawings of a cage turbine rotor with a "C-shaped" axial section according to the present invention.
Figure 7:
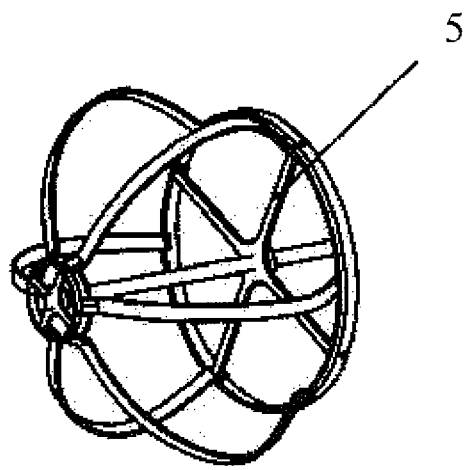

In another example, as shown in FIGS. 6 and 7, the body outline of the cage turbine is a configuration with a "C-shaped" axial section, that is, its contour line is of a curve arc convex outwards.

The axial space at the tail portion of the cage turbine can also be unopened.

Figure 8:
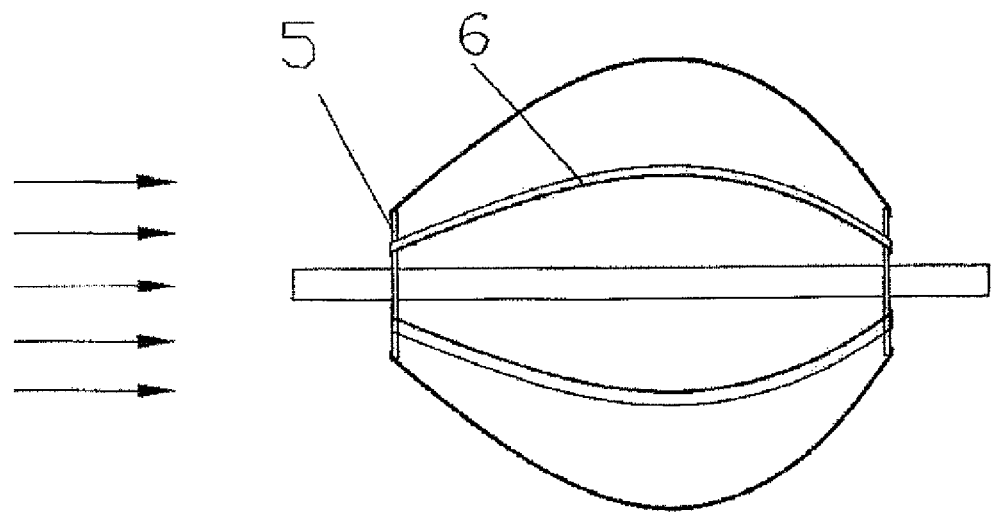
FIG. 8 is a schematic drawing of a turbine rotor with a Φ-shaped axial section according to the present invention.

As an example, as shown in FIG. 8, the body outline of the cage turbine has a thwart "Φ-shaped" axial section.

Figure 9:
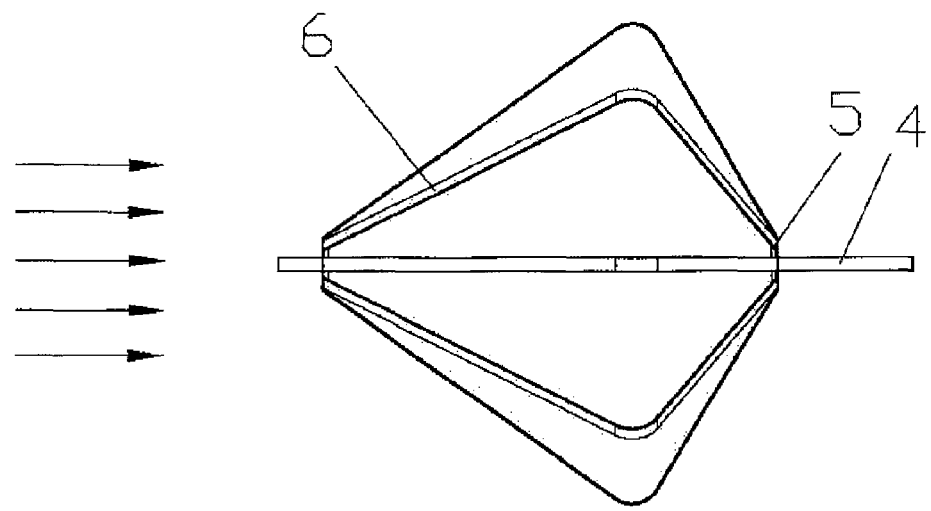
FIG. 9 is a schematic drawing of a turbine rotor with a hexagonal section according to the present invention.

As another example, as shown in FIG. 9, the body outline of the cage turbine has a hexagonal section, with the axis of the main shaft as one diagonal of this hexagonal section symmetric with respect to the axis.

As shown in FIGS. 4-9, the blades are located on the outside wall of the cage turbine along the longitudinal direction.

Figure 10:
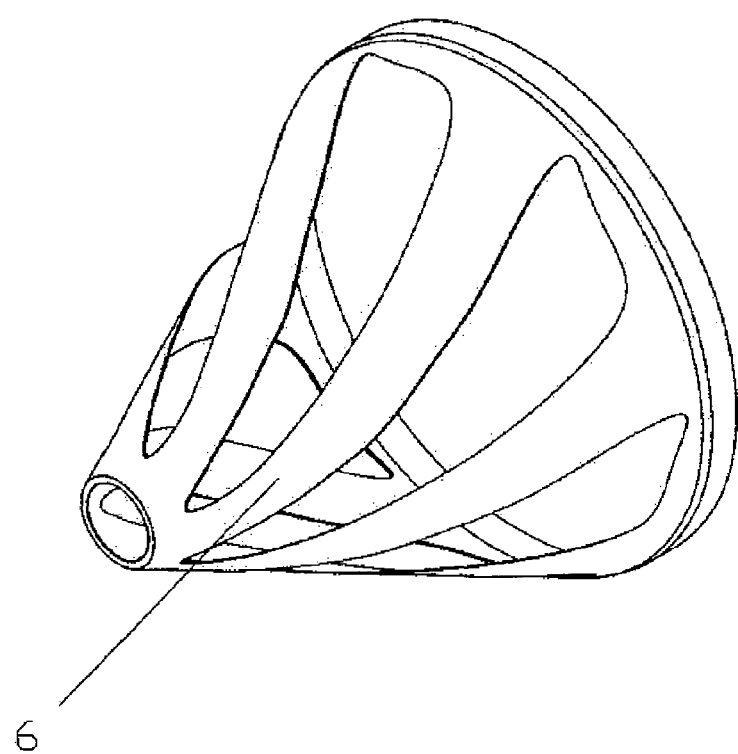
FIGS. 10 and 11 are outline structural drawings of the blades located on the outer wall of the cage turbine in a spiral configuration according to the present invention.
Figure 11:
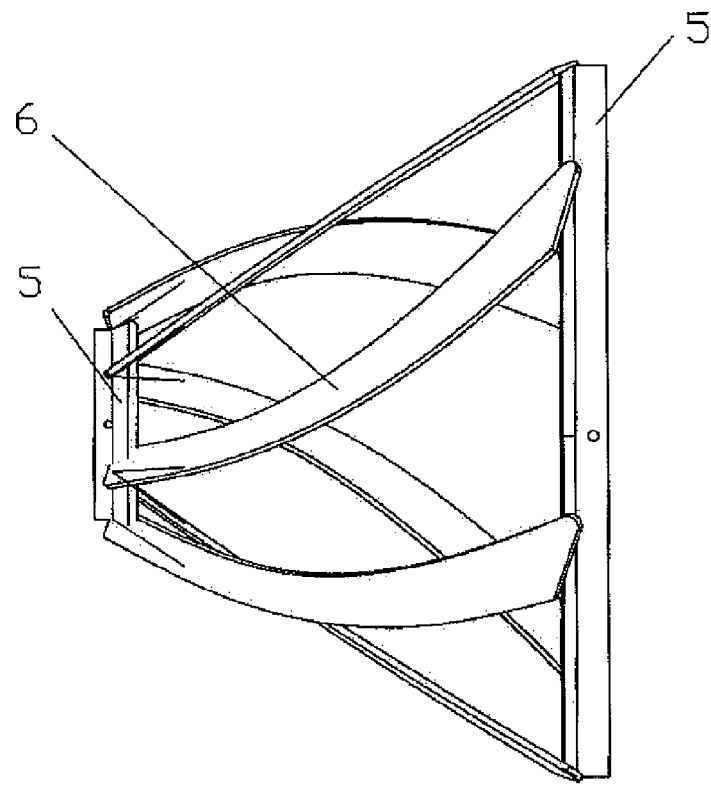

Alternatively, the blades can also be located on the outside wall of the cage turbine in a spiral configuration, as shown in FIGS. 10 and 11. The spiral configuration is advantageous in that with no step pulse effect during the sweeping process, the cage turbine is more easy to be started, which will thus prevent the sound frequency resonance and be more advantageous in lowering the airstream noise.

Figure 12:
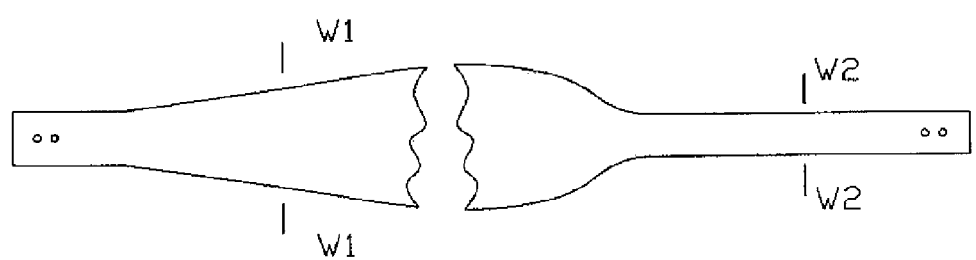
FIGS. 12-14 are dimension relation diagrams of a windward blade with the head portion and the central portion cut out of a thin plate according to the present invention.
Figure 13:
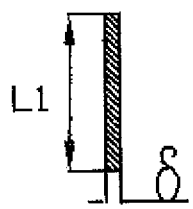
Figure 14:
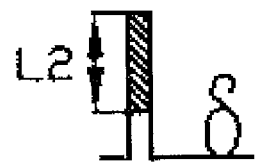
Figure 15:
FIGS. 15-18 are sectional shape schematic drawings of each cross section (i.e. vertical section) of the blade in the length direction according to the present invention.
Figure 16:
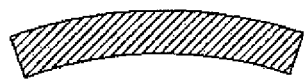
Figure 17:

The blade on the cage turbine is made of a thin plate, as shown in FIGS. 12-14. FIG. 13 is a sectional view of FIG. 12 along W1-W1, where the average width L1 is more than 12 times as large as the thickness $\delta$ of the plate. FIG. 14 is a sectional view of FIG. 12 along W2-W2, where the width L2 of the plate connecting the connector, between the blade and the main shaft and not used for accepting or exhausting wind, on the tail blade-mounting seat is less than 12 times as large as the thickness $\delta$.

Each cross section in the blade length direction, i.e. each vertical section, is either a uniform section or a varying section.

Figure 18:

As shown in FIGS. 15-18, the vertical section of the blade can be of any of the following shapes: A rectangle (FIG. 15), a circular quadrant (FIG. 16), a combined pattern of two round ends and a rectangular middle (FIG. 17), and an airfoil (FIG. 18). Of all the four options, the airfoil option has the optimum aerodynamic property; while the other three ones have a good aerodynamic property under high wind speed conditions but a poor lift at starting up under low wind speed conditions, however convenient in manufacture and ideal in economy.

The blade is either a flexible blade or a rigid blade against the centrifugal force deformation.

Figure 19:
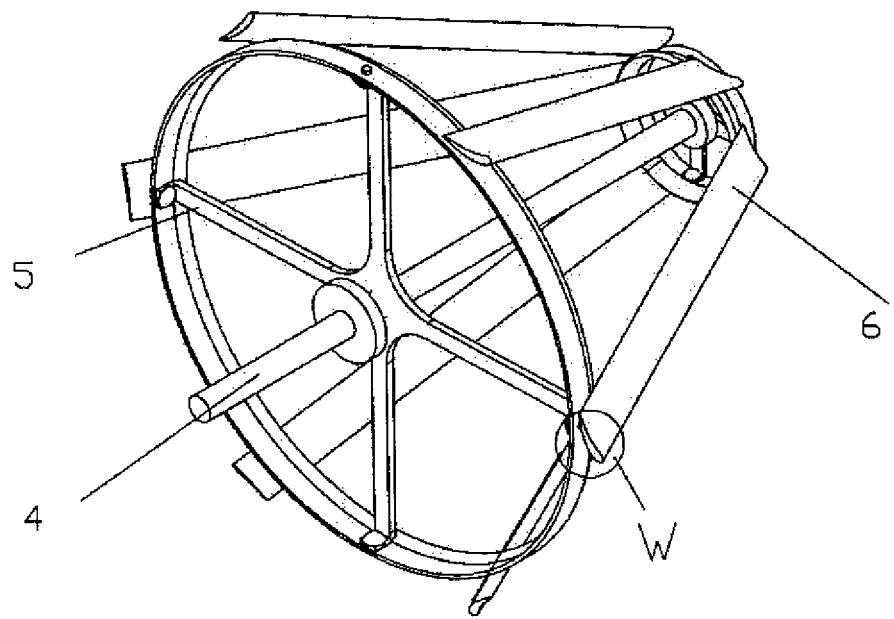
FIGS. 19 and 20 are schematic drawings of an example of the cage turbine rotor with a rigid blade according to the present invention.
Figure 20:
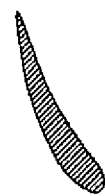

FIGS. 19 and 20 show an exemplary solution of a cage turbine rotor with the rigid blade according to the present invention. FIG. 20 is a partial enlarged drawing of the position W in FIG. 19. The rigid blade with the airfoil section undoubtedly possesses a good start-up lift and a good wind capturing efficiency.

Figure 21:
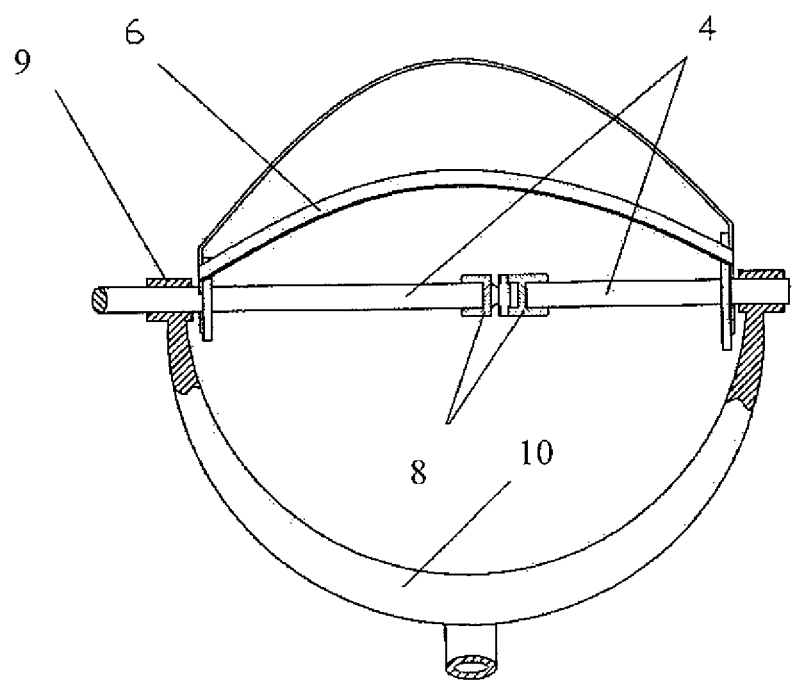
FIG. 21 is a schematic drawing of a segmentally combined shaft connected to form an integral by a transmission element according to the present invention.
Figure 22:
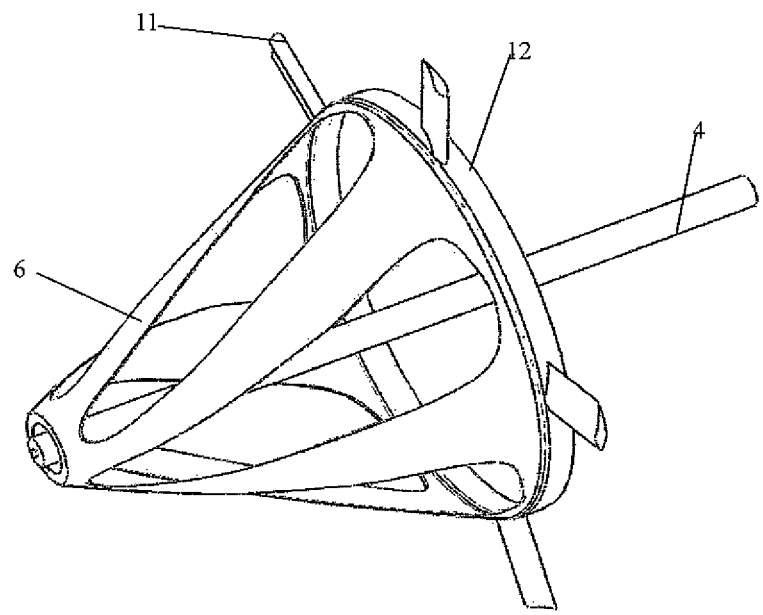
FIG. 22 is a schematic drawing of the V-shaped cage turbine with a short vane according to an example of the present invention.

As shown in FIG. 21, the main shaft is a segmentally combined shaft connected by a transmission element only transmitting a twisting moment instead of a bending moment. In order to prevent extension in the length direction due to the too long main shaft and harm to the system due to such reasons as excessive bending deformation of the shaft, the main shaft of the present invention is not necessary to be a rigid integral. It can be an assembly of multiple shafts, which are connected with each other via a coupling 8. This embodiment is also a special example within the scope of overall concept of the present invention, and will not be in conflict with the inventiveness of the present invention.

The blade is made of aluminum alloy or composite material by an extrusion process.

With the plane where the biggest diameter of the cage turbine is located as the boundary, at least one of the front portion and the rear portion of the cage turbine is provided with an angle of attack. In a preferred example, both the front portion and the rear portion of the cage turbine are provided with the angle of attack, with the two angles of attack both plus or both minus. For the examples as shown in FIGS. 8 and 9, the angle of attack at the front portion of the cage turbine can be used to drive the entire cage turbine to turn, while the angle of attack at the rear portion can further be used as an exhaust fan for ejecting the residual airstream from the upstream site backward out of the cage turbine, thus making the cage turbine produce sustained vacuum and propelling the airstream to circulate smoothly.

The following contents are testified by a great number of experiments in addition to the analysis based on the aerodynamic principle: All the examples according to the present invention have good property; for example, as for the three-bladed horizontal-axis-rotor WECS and the WECS according to the present invention with the same swept area, the mechanical shaft power obtained with the new technical solution is 17%-26% higher than that with the old one at a wind speed of 5 m/s; with the technology of the present invention, the aerodynamic noise is reduced to 2-4 decibels; with the present invention also good at mechanical vibration, the vibration obtained with the WECS of the present invention at a wind speed of 11 m/s is better than that with the three-bladed horizontal-axis-rotor WECS at a wind speed of 8 m/s. The related properties can further be improved if the new WECS is optimized.

The following contents can be indicated through the above examples and certain experiments: The WECS according to the technical solution of the present invention has better wind capturing efficiency, and can obtain more wind capturing energy in unit windward orthographic projection area, with the available power increased greatly; more importantly, it can therefore lower the requirement for the start-up wind speed, allowing easy electricity generation at a low start-up wind speed; therefore, it facilitates great expansion of speed and zone range where the WECS can be developed and applied as well as wide application of the WECS; moreover, the linear speed of this rotor at the cut-in wind position is greatly reduced compared with that of the three-bladed horizontal-axis-rotor WECS, and thus the airstream friction noise is greatly lowered, hence preventing the noise pollution; since the high linear speed is prevented and reduced, the harm to birds is also greatly reduced; because the blade is mounted by means of the twin head connection and the linear speed is reduced as well, the harm done by the centrifugal force is also significantly prevented, thus improving safety.

As shown in FIGS. 1 and 2, when a conical cage revolving-body obstacle is placed in a flow field with a steady wind speed, the following changes will happen in the flow field: The airstream will change its flowing path due to being subject to this obstacle, and flow along its external outline wall. If a Darrieus cage turbine is placed in the flow field of the incoming wind, since the outer circle of this conical cage revolving body is always surrounded by air rather than in a "vacuum", the surrounding air acts as a "pipe" in fact, restraining flowing space of the airstream and preventing the above air from keeping on permeating outwards in the radial direction, thus only allowing the airstream to flow forward within this "pipe"; hence, obviously, with the diameter of the revolving-body obstacle increasing, the airstream is compressed continuously and thus accelerated until leaving the site of the rotor with the biggest diameter, and only hereafter can the wind speed be continuously decreased. It is indicated by both the theoretical analysis and the practical flow field simulation that there are high airstream speed and intensive energy in the circular flow field around the revolution circle at the cage turbine outline wall with the biggest diameter. This explains not only the phenomenon of high airstream speed and energy density in the circular flow field, but its origin as well. In an example of the present invention, the cage rotor is additionally provided at the outer circle with some short vanes 11 uniformly distributed along its circumference, with these blades just cutting in the circular flow field. It is indicated by experiments that the wind catching efficiency of the blades is related with the angle of inclination of the short vane and its shape and area. A good result will be obtained when the angle of inclination of the short vane is within the range of 5-45 degrees and the section of the short vane is streamlined. When the airstream passes this region, it will impact the blade and exchange energy with the blade to transfer the kinetic energy to the blade, thus making the wind energy in the region captured and utilized.

In another example of the present invention, as shown in FIGS. 22-26, a WECS rotor with the Venturi-tube effect with the short vane is disclosed, with the cage turbine 3 provided at the outer edge with multiple short vanes 11 uniformly distributed along its circumference.

Figure 23:
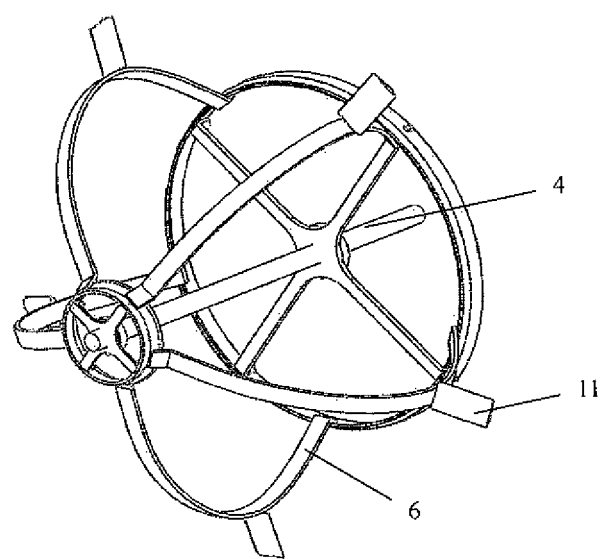
FIG. 23 is a schematic drawing of the C-shaped cage turbine with a short vane according to another example of the present invention.
Figure 25:
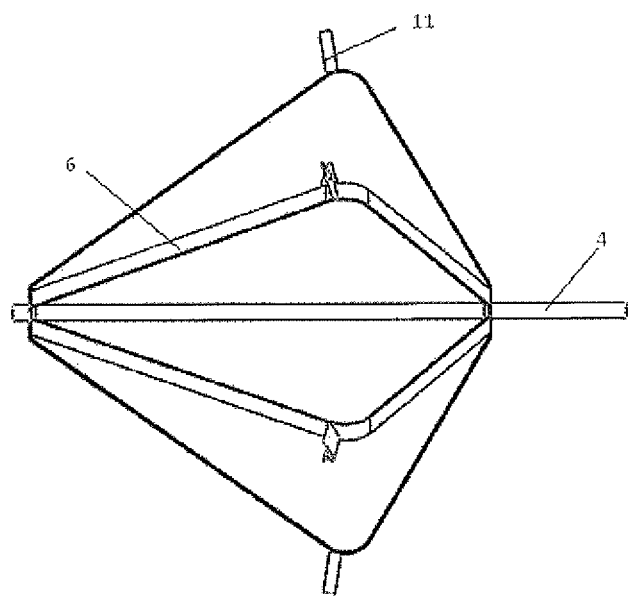
FIG. 25 is a schematic drawing of the hexagonal cage turbine with a short vane according to further another example of the present invention.

As shown in FIGS. 23 and 25, the multiple short vanes uniformly distributed along the circumference are mounted on the blade 6 of the cage turbine.

Figure 24:
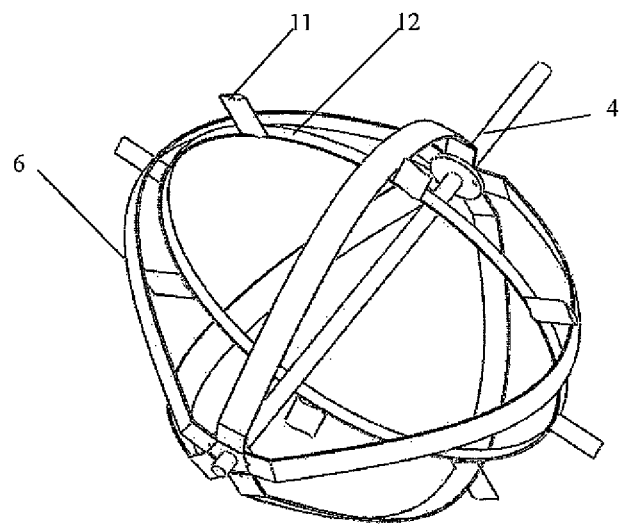
FIG. 24 is a schematic drawing of the Φ-shaped cage turbine with a short vane according to still another example of the present invention.

As shown in FIG. 24, the cage turbine 3 is provided at the outer edge with a shroud ring 12 in a plane perpendicular to the axial direction, and the multiple short vanes 11 uniformly distributed along the circumference are mounted on the shroud ring 12.

Figure 26:
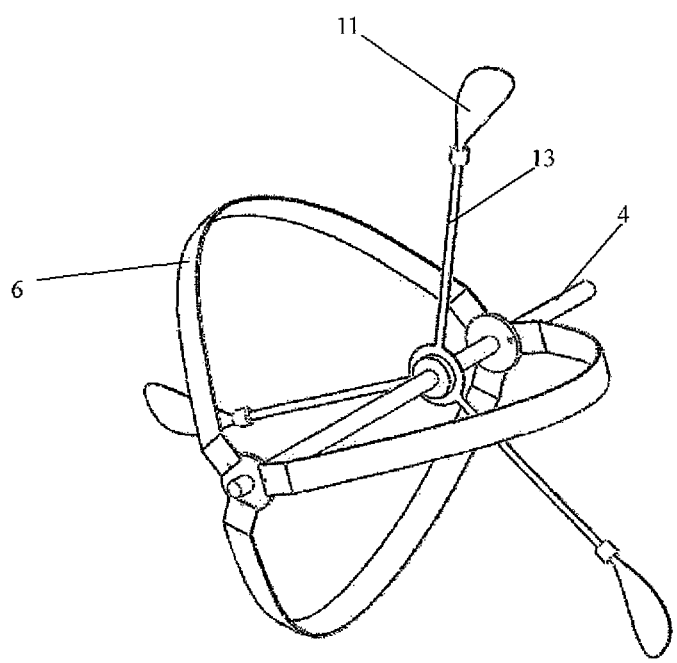
FIG. 26 is a schematic drawing of the cage turbine with a support on the main shaft according to a still further another example of the present invention.

As shown in FIG. 26, the main shaft 4 of the cage turbine is provided with a support 13, and the multiple short vanes 11 uniformly distributed along the circumference are mounted on the support 13.

The multiple short vanes uniformly distributed along the circumference are mounted on the outer edge of the section of the cage turbine with the biggest diameter.

The present invention, by providing for the WECS a WECS rotor with the Venturi-tube effect, lowers the requirement for the start-up wind speed, allows easy electricity generation at a low start-up wind speed, and therefore facilitates great expansion of speed and zone range where the WECS can be developed and applied as well as wide application of the WECS; moreover, the linear speed of this rotor at the cut-in wind position is greatly reduced compared with that of the three-bladed horizontal-axis-rotor WECS, and thus the airstream friction noise greatly lowered, hence preventing the noise pollution; since the high linear speed is prevented and reduced, the harm to birds is also greatly reduced; because the blade is mounted by means of the twin head connection and the linear speed reduced as well, the harm done by the centrifugal force is also significantly prevented, thus improving safety.

LIST OF REFERENCE NUMBERS

1. A virtual boundary outline of the influence area formed by the airstream after being subject to an obstacle, this outline defining the biggest space scope where the airstream can permeate outwards.
2. A conical revolving-body obstacle, being characterized in a small head and a big tail; the virtual boundary outline of the influence area formed by the airstream after being subject to an obstacle forms together with the conical revolving-body obstacle a special Venturi tube, i.e. a Venturi tube with a circular conical revolving-body section, with such processes as the airstream being compressed, accelerated, and decompressed occurring one by one (That is, the airstream is introduced in the segment A, and compressed, accelerated, and decompressed gradually in the segment B; a part of the fluid wind energy outside the original flow field is inhaled in the rear half of the segment B as well as in the segment C; and then the airstream is expanded, decelerated, and pressurized inside the cage turbine and the segment D).
3. Revolving-body cage turbine.
3*i*. The head portion of the cage turbine.
3*ii*. A window constituted by the adjacent blades in the blade-enveloping portion of the cage turbine.
3*iii*. The tail portion of the cage turbine.
4. The main shaft of the rotor.
5. Blade-supporting block.
6. Blade.
7. Tail exhaust blade.
8. Coupling.
9. The support axle seat of the rotor.

10. The support fork of the rotor.
11. Short vane.
12. Shroud ring.
13. Support.

What is claimed is:

1. A rotor of wind energy conversion system (WECS) with the Venturi-tube effect, comprising:
a horizontal main shaft with multiple blades positioned around, a blade-mounting seat fixed on the main shaft for mounting the blades, and a connector between them; all the blades mounted on the blade-mounting seat envelop together to form a revolving-body cage turbine with the main shaft as the revolving axle; the blade-mounting seat includes a front blade-mounting seat and a rear blade-mounting seat, with both ends of the blade fixed on the two blade-mounting seats, respectively; the cage turbine includes a head portion at the windward end, a tail portion at the wind exhaust end, and an airstream compression portion between the head portion and the tail portion and constituted by the enveloping blades; the cage turbine forms a dynamic Venturi tube during the revolving process, with which the blade revolves to constitute its outline tube wall with air permeability; and an airstream passes through a window between the blades, and incoming wind does work towards the blade during the process of permeating from the external space to the internal space of this outline tube wall, thus realizing the energy transfer,
wherein the blade on the cage turbine is made of a thin plate, whose average width is more than 12 times as large as the thickness of the plate, with the width of the plate connecting the connector, between the blade and the main shaft and not used for accepting or exhausting wind, on the tail blade-mounting seat being less than 12 times as large as the thickness.

2. The WECS rotor with the Venturi-tube effect according to claim 1, wherein an axial space at the tail portion of the cage turbine is open.

3. The WECS rotor with the Venturi-tube effect according to claim 2, wherein exhaust blades, located in a plane perpendicular to the axial direction at the tail portion of the cage turbine, acts as an exhaust fan for ejecting the residual airstream from the upstream site backward out of the cage turbine, thus making the cage turbine produce sustained vacuum and propelling the airstream to circulate smoothly.

4. The WECS rotor with the Venturi-tube effect according to claim 1, wherein revolution diameters of the airstream compression portion of the cage turbine is gradually increased from the head portion to the tail portion.

5. The WECS rotor with the Venturi-tube effect according to claim 4, wherein the cage turbine has a "V-shaped" axial section and a badminton-shaped body outline having a contour line comprising an approximately straight curve.

6. The WECS rotor with the Venturi-tube effect according to claim 1, wherein the body outline of the cage turbine is a configuration with a "C-shaped" axial section having a contour line comprising a curve arc convex outwards.

7. The WECS rotor with the Venturi-tube effect according to claim 1, wherein an axial space at the tail portion of the cage turbine is unopened.

8. The WECS rotor with the Venturi-tube effect according to claim 7, wherein a contour line of the cage turbine has a thwart "Φ-shaped" axial section.

9. The WECS rotor with the Venturi-tube effect according to claim 7, wherein a contour line of the cage turbine has a hexagonal section, with the axis of the main shaft as one diagonal of this hexagonal section symmetric with respect to the axis.

10. The WECS rotor with the Venturi-tube effect according to claim 1, wherein the blades are located on the outside wall of the cage turbine along the longitudinal direction.

11. The WECS rotor with the Venturi-tube effect according to claim 1, wherein the blades are located on the outside wall of the cage turbine in a spiral configuration.

12. The WECS rotor with the Venturi-tube effect according to claim 1, wherein each cross section in the blade length direction, i.e. each vertical section, is a varying section.

13. The WECS rotor with the Venturi-tube effect according to claim 1, wherein a vertical section of the blade can be of any of the following shapes: a rectangle, a circular quadrant, a combined pattern of two round ends and a rectangular middle, and an airfoil.

14. The WECS rotor with the Venturi-tube effect according to claim 1, wherein the blade is a flexible blade.

15. The WECS rotor with the Venturi-tube effect according to claim 1, wherein the main shaft is a segmentally combined shaft connected by a transmission element only transmitting a twisting moment instead of a bending moment.

16. The WECS rotor with the Venturi-tube effect according to claim 1, wherein the blade is made of aluminum alloy or composite material by a cutting process.

17. The WECS rotor with the Venturi-tube effect according to claim 1, wherein with the plane where the biggest diameter of the cage turbine is located as the boundary, at least one of the front portion and the rear portion of the cage turbine is provided with an angle of attack.

18. The WECS rotor with the Venturi-tube effect according to claim 17, wherein both the front portion and the rear portion of the cage turbine are provided with the angle of attack, with the two angles of attack both plus or both minus.

19. The WECS rotor with the Venturi-tube effect according to claim 1, wherein multiple short vanes are provided at an outer edge of the cage turbine uniformly distributed along its circumference.

20. The WECS rotor with the Venturi-tube effect according to claim 19, wherein a shroud ring is provided at the outer edge of the cage turbine in a plane perpendicular to the axial direction, and the multiple short vanes uniformly distributed along the circumference are mounted on the shroud ring.

21. The WECS rotor with the Venturi-tube effect according to claim 19, wherein the multiple short vanes uniformly distributed along the circumference is mounted on a strip blade of the cage turbine.

22. The WECS rotor with the Venturi-tube effect according to claim 19, wherein the main shaft of the cage turbine is provided with a support, and the multiple short vanes uniformly distributed along the circumference are mounted on the support.

23. The WECS rotor with the Venturi-tube effect according to claim 19, wherein the multiple short vanes uniformly distributed along the circumference are mounted on the outer edge of the section of the cage turbine with the biggest diameter.

24. The WECS rotor with the Venturi-tube effect according to claim 19, wherein the short vane has an angle of inclination of 5-45 degrees.

25. The WECS rotor with the Venturi-tube effect according to claim 19, wherein the short vane has a streamlined section.

* * * * *